G. N. SAEGMULLER.
INDICATOR OPERATING MEANS.
APPLICATION FILED FEB. 1, 1910.
961,898.
Patented June 21, 1910.
3 SHEETS—SHEET 1.
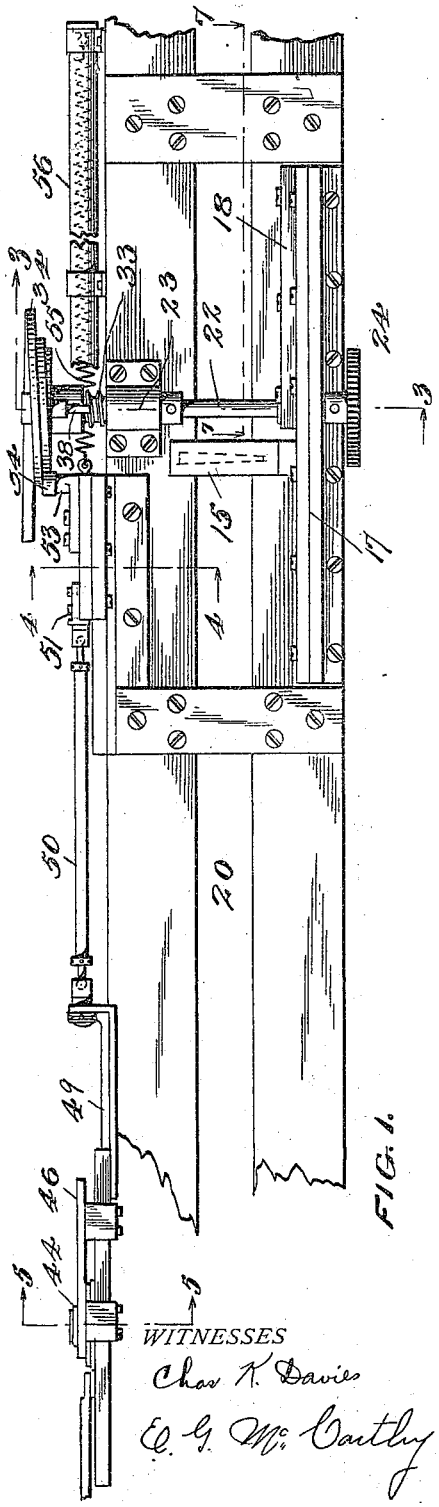
FIG. 1.
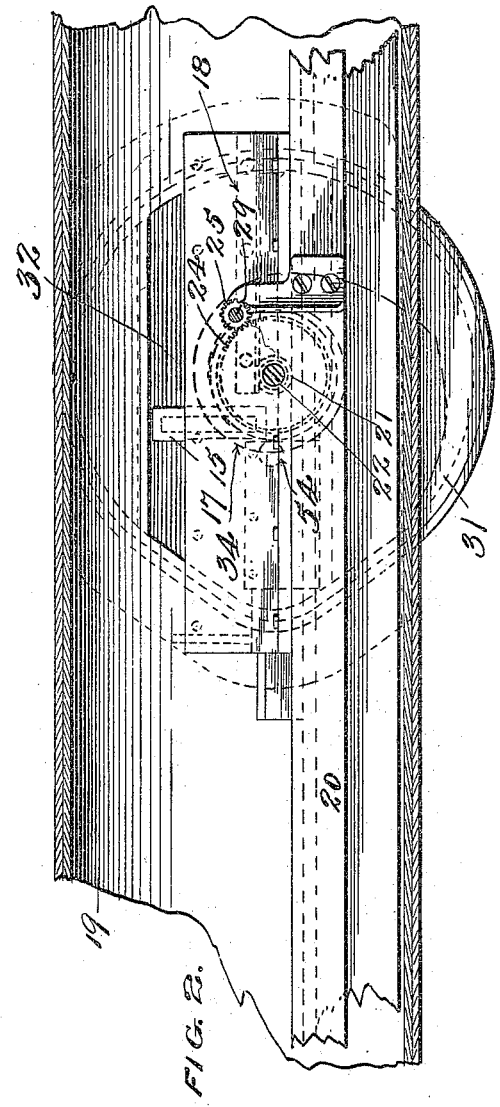
FIG. 2.
WITNESSES
Chas. K. Davies
E. G. McCarthy
George N. Saegmuller
INVENTOR
by
Attorney

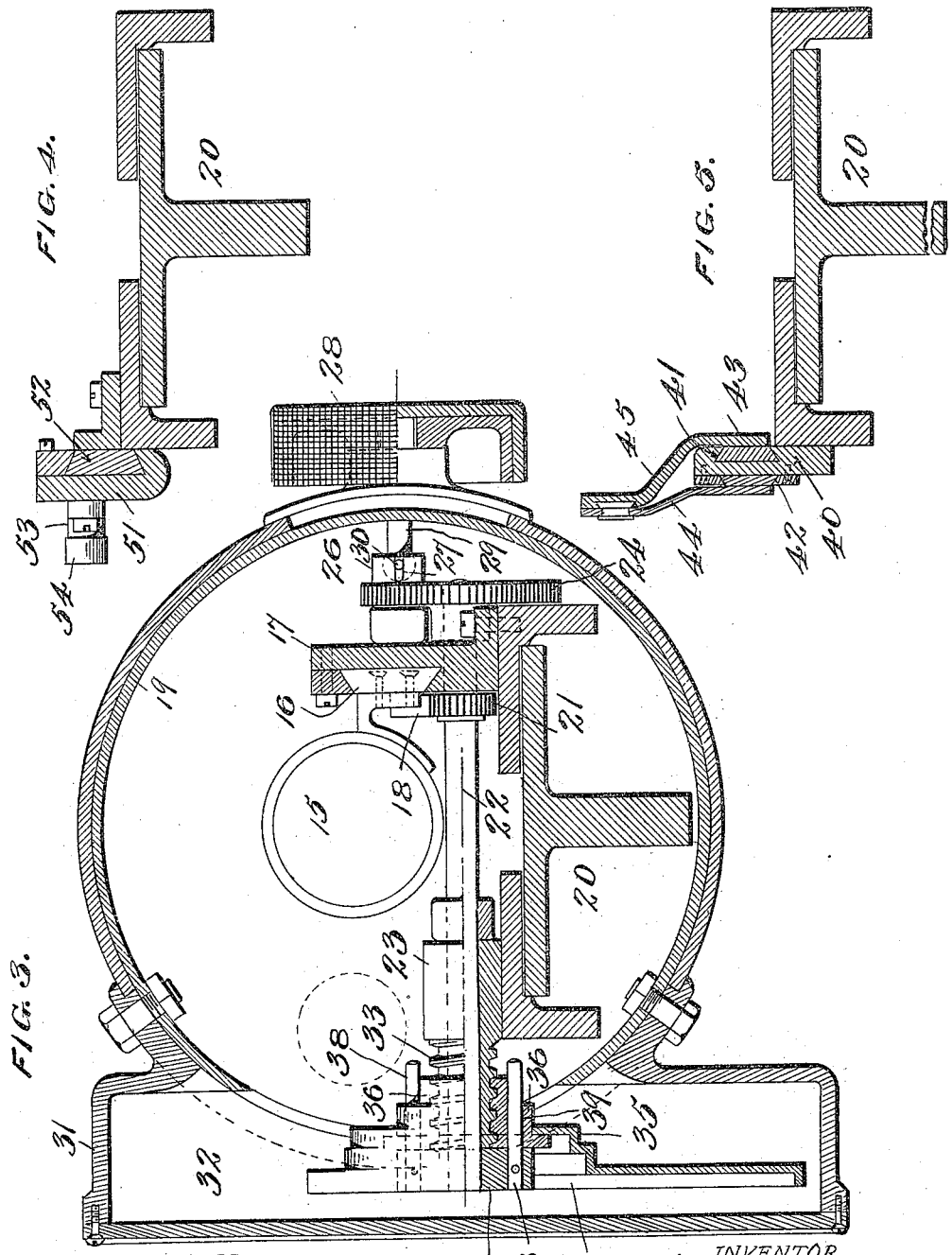

G. N. SAEGMULLER.
INDICATOR OPERATING MEANS.
APPLICATION FILED FEB. 1, 1910.
961,898.
Patented June 21, 1910.
3 SHEETS—SHEET 3.
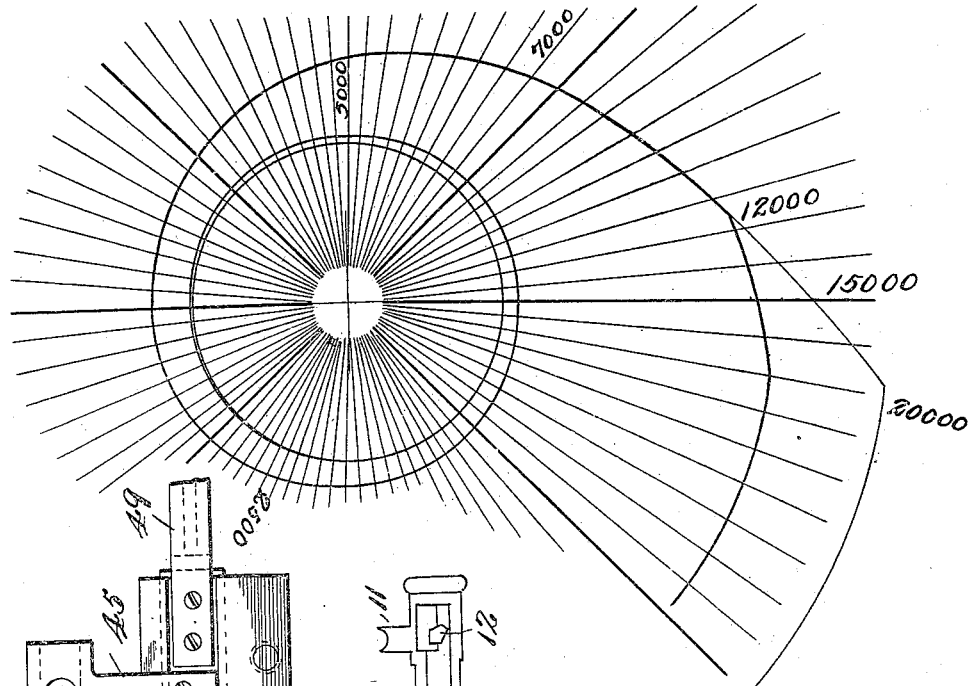
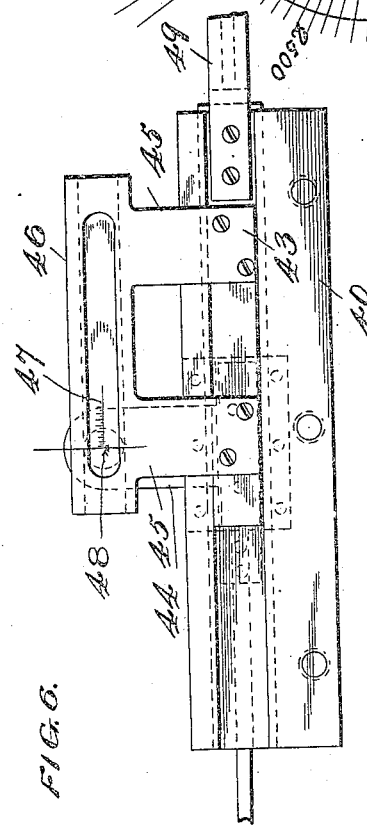
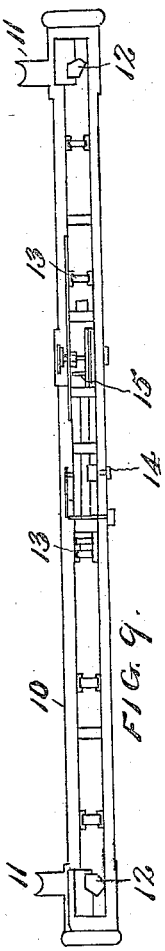
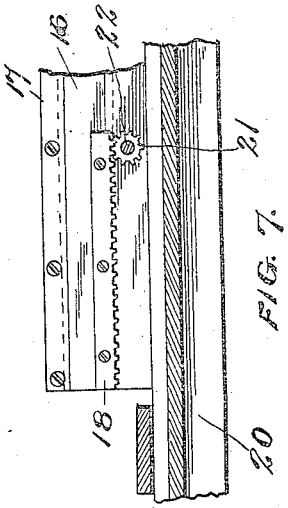
WITNESSES
Chas. K. Davies
E. G. McCarthy
INVENTOR
George N. Saegmuller
by B. _____ Attorney

UNITED STATES PATENT OFFICE.

GEORGE N. SAEGMULLER, OF ROCHESTER, NEW YORK.

INDICATOR-OPERATING MEANS.

961,898.     Specification of Letters Patent.     Patented June 21, 1910.

Application filed February 1, 1910. Serial No. 541,276.

*To all whom it may concern:*

Be it known that I, GEORGE N. SAEGMULLER, a citizen of the United States, residing at Rochester, in the county of Monroe and State of New York, have invented new and useful Improvements in Indicator-Operating Means, of which the following is a specification.

The present invention relates more particularly to means for effecting the even motion of the indicator of a device having a variable movement of a gradually decreasing or gradually accelerating character. For instance, it is well known to those skilled in the art that in all range finders of the coinciding type, where two images are produced, which are brought into coincidence at the eye-piece, the scale for near distances is quite large and decreases as the distance increases. In this type of range finder, two telescopes with two objectives are employed having a common eye-piece, in which the two images made by the objectives can be seen. If the finder is sighted on an object comparatively close, the two images produced in the eye piece are quite far apart, while they come nearer together with distant objects, and as infinity is reached, the images coincide. For instance, if sighted on the sun or a star, but one image will be seen. In order to measure the distance, the two images produced are brought into register, or in other words, are made to coincide, and this is ordinarily done by moving a prism back and forth in the path of rays of one telescope. With this movement is effected the movement of a suitable scale or indicator, and the movement of said scale or indicator necessarily varies with that of the prism, according to the distance. In other words, the scale for near distances is quite large, and decreases proportionately and inversely to the increase in distance. Thus, though the scale from one to two thousand yards may be nearly one inch long, this scale gradually decreases until from nineteen to twenty thousand yards, it may be only one-sixteenth of an inch in length. This renders subdivisions into ten and twenty yard units for long distances practically impossible, and it is also not practicable to estimate the fractions of such amounts, as ten or twenty yards, by the eye. The present invention overcomes this very serious objection, in that it permits the use of a scale or indicator of practically equal divisions throughout its length, an even movement being imparted to the scale or indicator, irrespective of the gradually decreasing or gradually accelerating movement of the coinciding prism or other device.

An embodiment of the invention is disclosed in the accompanying drawings, wherein:—

Figure 1 is a plan view of a portion of the mechanism for effecting the operation of an indicating device and the coinciding wedge or prism. Fig. 2 is a vertical longitudinal sectional view therethrough. Fig. 3 is a cross sectional view, portions being shown in elevation, and substantially on the line 3—3 of Fig. 1. Figs. 4 and 5 are cross sectional views on enlarged scales and on the lines 4—4 and 5—5 of Fig. 1. Fig. 6 is a detail view in elevation of the indicating means. Fig. 7 is a detail view of the rack and pinion for operating the device to be indicated. Fig. 8 is a diagrammatic view, illustrating the method of laying off the cam. Fig. 9 is a diagrammatic view of a range finder, illustrating the relation of the parts.

Similar reference numerals designate corresponding parts in all the figures of the drawings.

Referring first to Fig. 9, it may be stated that the usual outer casing 10 is employed having side openings 11 at the ends, behind which are disposed the usual penta prisms 12 that deflect the rays to the objectives 13. A common eye-piece 14 is employed, to which the pencils of rays from the objectives are carried, and interposed between this eye-piece and one of the objectives, is a coinciding wedge or prism 15 that is adjustable toward and from the adjacent objective in order to bring the two images into coincidence at the eye-piece.

As shown in the detail views, the element 15 is carried by a sliding bar 16 mounted in a suitable supporting way 17, and having a longitudinally disposed rack 18. The way 17 is carried by suitable supporting means arranged within the outer casing 19, and designated generally by the reference numeral 20. The rack 18 is in mesh with a pinion 21 that is carried by a transversely disposed shaft 22 journaled at one end in the guide-way 17 and at the other end in a stationary bearing box 23. One end of this shaft carries a gear wheel 24, in mesh with which is a pinion 25 having a hub 26 that is slotted, as shown at 27. A rotary actuating knob or head 28, arranged outside the casing 19, is provided with a stem 29, having a cross pin 30 that is engaged in the slots 27. It will therefore be evident that upon the rotation of the knob 28, the member 15 will be moved back and forth. As already explained, and as is well known to those skilled in the art, the movement of this member 15 is variable, depending on the distance of the object sighted upon.

In the present embodiment of the invention, and as shown in Fig. 3, the tubular casing 19 has on one side an enlargement 31, forming an internal chamber 32, into which projects a stationary screw 33 carried by the bearing box 23, and surrounding the shaft 22. Rotatable on this screw and having a threaded engagement therewith, is an actuating cam 34 provided with a spiral peripheral track 35. As shown, the portion carrying the said track 35, is fixed to a hub 36 that is threaded upon the screw 33, though it will be evident that the two parts may be made integral, if desired. Fixed to the shaft 22 is a head 37 that is provided with a plurality of pins 38 arranged parallel to said shaft and having sliding engagements, as shown at 39, with the hub 36. From the above description, taken in connection with the drawings, it will be clear that when the knob 28 is rotated, to move the element 15 back and forth, the cam will also be revolved, and at the same time, will have a lateral movement back and forth, because of its engagement with the stationary screw 33.

Suitably mounted on a portion of the support, is a guideway 40 having grooves 41 and 42 in its opposite sides. Slidably mounted in these grooves, are relatively movable indicating elements 43 and 44, one of which, as 44, is normally fixed, but can be adjusted manually, as desired. The other 43, is shown in Fig. 6 to have a pair of upstanding arms 45 carrying a bar 46 that is provided with a scale 47. The other element 44 has a pointer, as 48, that coacts with the scale, said scale being formed, for instance, on a transparent sheet, so that the pointer is visible. The element 43 has secured to it, a bracket 49, to which is connected by an extensible coupling 50, a sliding member or device 51 mounted on a guide track 52, and carrying an outstanding gudgeon 53, on which is mounted a roller 54. The roller operates against the peripheral spiral track 35 of the cam, and is held thereagainst by coiled springs 55 housed in a tubular casing 56 and connected to the device 51. Now the track 35 of the cam is such that it will give an even movement to the scale, notwithstanding the variable movement necessarily accorded to the element 15. For example, the nearer infinity is reached in measuring, the less amount of movement there must be to the element 15, while the greater amount of movement in proportion there must be to the indicating element, and this is obtained by the particular configuration of the cam. To make this clear, in Fig. 8, there is illustrated a diagram, showing how the cam is laid out, according to two coördinates, one giving the angular disposition, while the other represents the linear dimensions from the center of the cam, and while a predetermined value of the scale may be employed for all ordinary distances, if the distances to be measured are very great, it may be advisable to change the value of the scale, because of the obliquity reached by the cam, the track becoming too steep to insure a positive movement. For example, on the cam, as disclosed, one value stops at twelve thousand yards, and from twelve thousand to twenty thousand, a different value of the scale is employed. Now, in connection with range finders, for instance, inasmuch as the firing limit is not beyond ten thousand yards, it is perfectly safe to stop the first movement at twelve thousand, but it will be obvious to any one skilled in the art, that there is no insurmountable difficulty in extending the cam and the consequent even division of the scale, even farther up, say to twenty-five thousand yards. Furthermore the standard of measurement of the scale is preferably not that ordinarily employed at the place of the greatest movement of the element 15, nor at the minimum, but the movement at an intermediate point is preferably employed as the standard, in order that the scale may be of reasonable size.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. In mechanism of the character set forth, the combination with spaced objectives and an eye-piece common thereto, of means having a variable amount of movement for causing the images of the objectives to coincide at the eye-piece, a device for indicating the amount of movement of said means, and means connecting the coinciding means and device for always effecting an even movement of the latter upon the variable movement of the former.

2. In mechanism of the character set forth, the combination with relatively reciprocatory coacting indicating elements, of a device, the movement of which is to be indicated, said movement being variable, and means for effecting an even relative reciprocation between the indicating elements upon the said variable movement of the device.

3. In mechanism of the character set forth, the combination with spaced objectives and an eye-piece, of means having a variable amount of movement for causing the images of the objectives to assume a predetermined relation at the eye piece, measuring means for indicating the amount of movement of said image-adjusting means and comprising relatively reciprocatory indicating elements, and means for effecting an even relative reciprocation between the indicating elements upon the said variable movement of the image-adjusting means.

4. In mechanism of the character set forth, the combination with spaced objectives and an eye-piece common thereto, of means having a variable amount of movement for causing the images of the objectives to assume a predetermined relation at the eye-piece, relatively movable coacting indicating elements for said means, a common actuating member for the indicating elements and the means, and mechanism for transmitting from said actuating member, an even relative movement of the indicating elements when the image-adjusting means is given a variable movement by the actuating member.

5. In mechanism of the character set forth, the combination with a rotatable actuating member, of coacting indicating elements, one of which is reciprocated on the rotation of the actuating member, a device, the movement of which is to be indicated, said device having a reciprocatory variable movement, and means for transmitting from said actuating member an even relative movement of the indicating elements when the device is given a variable movement by the member.

6. In mechanism of the character set forth, the combination with relatively reciprocatory indicating elements, of a revoluble cam, and means actuated by said cam on its rotation to effect the relative reciprocation of the indicating elements.

7. In mechanism of the character set forth, the combination with a rotatable spiral actuating cam, of a device having a bearing against the cam and having a back and forth movement effected by said cam on its rotation, and means for also effecting a relative movement between the cam and device to maintain the said bearing.

8. In mechanism of the character set forth, the combination with a rotatable actuating cam capable of lateral movement, of a device actuated by the cam, and means for effecting the lateral movement of said cam on its rotation.

9. In mechanism of the character set forth, the combination with a rotatable actuating member, of a member actuated thereby on its rotation, said actuating member having a lateral movement with respect to the actuated member, and means for effecting the lateral movement of said member on its rotation.

10. In mechanism of the character set forth, the combination with a rotary actuating member capable of lateral reciprocation, of means for effecting its simultaneous reciprocation and rotation, and means actuated by said member on its rotation.

11. In mechanism of the character set forth, the combination with a rotatable actuating member capable of lateral reciprocation, of means for effecting its simultaneous reciprocation and rotation, and a device movable toward and from the axis of the actuating member and operated thereby.

12. In mechanism of the character set forth, the combination with a rotatable actuating cam capable of axial movement, of means for effecting said axial movement on its rotation, and a device movable toward and from the axis of the cam and operated thereby.

13. In mechanism of the character set forth, the combination with a cam having a spiral track, said cam being capable of lateral back and forth movement, means for effecting such movement, and a reciprocatory device bearing against the track and held against lateral movement.

14. In mechanism of the character set forth, the combination with a screw bearing element, of a rotary actuating member threaded thereon and moved along the same upon the rotation of said member, and means actuated by the said member.

15. In mechanism of the character set forth, the combination with a stationary screw, of a rotary actuating member threaded thereon and movable along the same on its rotary movement, and means actuated by said member.

16. In mechanism of the character set forth, the combination with a bearing box having a screw, of a shaft journaled in the box, a rotary actuating member threaded on the screw and rotated by the shaft, and means actuated by said member.

17. In mechanism of the character set forth, the combination with a bearing box having a screw, of a shaft journaled in the box, a rotatable actuating member threaded on the screw and slidably connected to the shaft, means for operating the shaft, and means actuated by the member.

18. In mechanism of the character set forth, the combination with a shaft having a head at one end, of a bearing box for said shaft having a screw surrounding the same, a cam threaded on the shaft and having a sliding interlocking connection with the head, said cam having a spiral peripheral track, and a reciprocatory actuated member bearing against the track.

19. In mechanism of the character set forth, the combination with a reciprocatory indicating element, of a rotary actuating cam therefor, a device operated by the cam for moving the indicating element, and means for effecting a relative lateral movement between the cam and indicating element.

20. In mechanism of the character set forth, the combination with a reciprocatory indicating element, of a rotary actuating cam therefor having a spiral track, a device bearing against the spiral track, and means for effecting a relative lateral movement between the cam and device to maintain said bearing.

21. In mechanism of the character set forth, the combination with coacting indicating elements, one of which is movable back and forth, of a rotary cam having a spiral track, means on which said cam is mounted for effecting its lateral movement, means for rotating the cam, and a device bearing against the track and connected to the indicating element for operating the same.

22. In mechanism of the character set forth, the combination with a bearing box having a screw projecting therefrom, of a spiral cam having a rotary threaded engagement with the screw, a shaft journaled in the box, a sliding connection between the cam and shaft, a reciprocatory indicating device having a portion bearing against the cam, and a spring for maintaining said bearing.

23. In mechanism of the character set forth, the combination with a reciprocatory member, the variable movement of which is to be measured, of relatively movable indicating elements for effecting such measurement, an actuating device common to the member and to the indicating elements, a rotary cam operated by the actuating device and having a track, a device for effecting the relative movement of the elements, engaging the track, and means for effecting a lateral movement of the cam on its rotation.

24. In mechanism of the character set forth, the combination with a reciprocatory member having a variable movement to be measured, of a rack connected thereto, a shaft having a pinion engaging the rack, a bearing box for the shaft having a fixed screw, a spiral cam having a rotatable threaded engagement with the screw, a head fixed to the shaft and having a slidable interlocking engagement with the cam, a reciprocatory measuring element, a device connected thereto, and bearing against the cam, and a spring for maintaining such bearing.

In testimony whereof I have hereunto set my hand in presence of two subscribing witnesses.

GEORGE N. SAEGMULLER.

Witnesses:
HENRY C. THON,
DANIEL M. SMITH.